United States Patent [19]

Kamimura

[11] Patent Number: 5,100,167
[45] Date of Patent: Mar. 31, 1992

[54] SUSPENSION SYSTEM FOR AUTOMOTIVE VEHICLE

[75] Inventor: Shoichi Kamimura, Hiroshima, Japan

[73] Assignee: Mazda Motor Corporation, Hiroshima, Japan

[21] Appl. No.: 674,252

[22] Filed: Mar. 25, 1991

[30] Foreign Application Priority Data

Mar. 23, 1990 [JP] Japan .................................. 2-74514

[51] Int. Cl.[5] .............................................. B60G 11/26
[52] U.S. Cl. ................................... 280/707; 280/708; 364/424.05
[58] Field of Search ............... 280/707, 704, 693, 708; 364/424.05

[56] References Cited

U.S. PATENT DOCUMENTS

| | | | |
|---|---|---|---|
| 4,953,890 | 9/1990 | Kamimura | 280/707 |
| 4,980,830 | 12/1990 | Aoki et al. | 280/707 |
| 5,046,754 | 9/1991 | Kimura et al. | 280/707 |
| 5,056,812 | 10/1991 | Takehara et al. | 280/707 |

FOREIGN PATENT DOCUMENTS 0204811  8/1989  Japan .................................. 280/707

Primary Examiner—Charles A. Marmor
Assistant Examiner—Tamara L. Finlay
Attorney, Agent, or Firm—Fish & Richardson

[57] ABSTRACT

A suspension system for an automotive vehicle has a cylinder interposed between a sprang weight and an unsprung weight for each of wheels so as to control the supply or discharge of operating liquid to the cylinder independently and separately, thereby controlling the posture of the vehicle body. This suspension system allows a slow control over the posture of the vehicle body, for example, by lowering a control gain for the posture control when the vehicle body is jacked up in order to exchange tires, inspection of the vehicle body, etc., to a greater degree than when the vehicle is running at ordinary conditions.

26 Claims, 9 Drawing Sheets

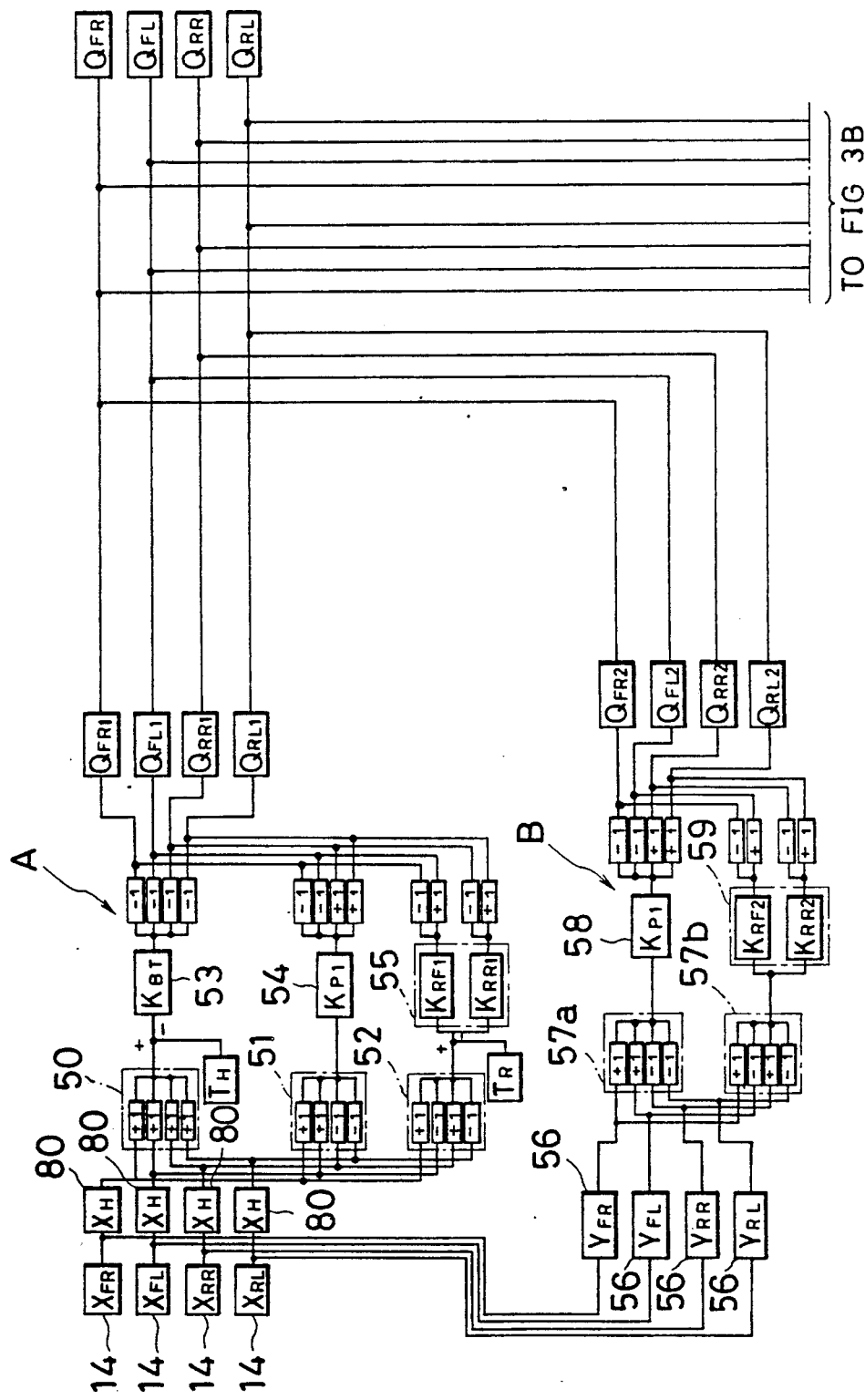

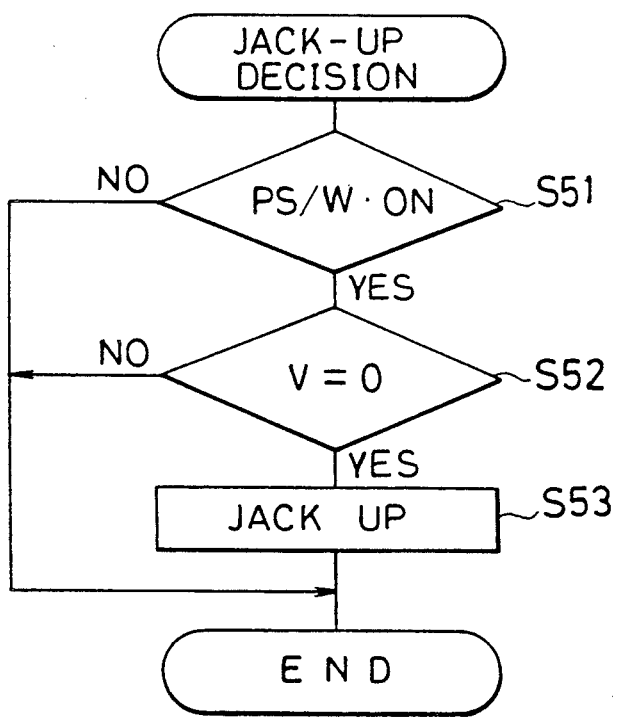

SUSPENSION SYSTEM FOR AUTOMOTIVE VEHICLE

BACKGROUND OF THE INVENTION

1. Field of the Invention

The present invention relates to a suspension system for an automotive vehicle and, more particularly, to a suspension system for an automotive vehicle so adapted as to change suspension characteristics by supplying or discharging liquid to or from a cylinder particularly to control a jacked-up state of the automotive vehicle.

2. Description of Related Art

Heretofore, as disclosed in Japanese Patent Laid-open (kokai) Publication No. 130,418/1988, for example, a so-called active control suspension system (ACS system) is known, which is so designed as to be capable of changing the suspension characteristics by controlling an independent and separate supply or discharge of liquid to or from each of cylinders which are disposed between sprang weight and unsprung weight for each of the wheels and to each of which plural gas springs are connected.

Such an ACS system generally controls the automotive vehicle body so as to assume an equally high vehicle height at each of all the four wheels.

In this control, however, the following problems may arise when the vehicle body is jacked up, as in the case of mounting a chain to each of the wheels, while an ignition switch is kept turned on at the time of parking.

In other words, when only one of the wheels is jacked up, the cylinder on the side of the wheel jacked up is caused to extend and the vehicle height at this wheel increases, while the vehicle height at the wheel on the opposite side is reduced. In this case, it is determined that the vehicle height on the side of the wheel jacked up is extending, so that the ACS system is allowed to operate reducing a cylinder pressure so as to contract the vehicle height at the wheel jacked up, while increasing the cylinder pressure so as to expand the vehicle height at the opposite wheel. As a result, excessive load is caused to be rapidly imposed upon a jack, thereby giving undesirable feel in operating the jack.

In order to solve this problem, it is proposed that the suspension control be suspended at the time of jacking up the wheel, as disclosed in Japanese Patent Publication (kokoku) No. 3,685/1989 and Japanese Patent Laid-open (kokai) Publication No. 289,417/1987).

It is to be noted, however, that a stop of the suspension control at the time of jacking up the wheel may cause another problem. In other words, as the suspension control is executed in a state that an ignition switch is being turned on, there are occasions where an operator or passenger is still stayed in the vehicle compartment even at the time of jacking the wheel up, when the ignition switch is turned on. In this case, if a suspension control would be suspended, a distribution of load varies to a great extent when the operator or passenger gets out, and the vehicle body may be left in an undesirably lean posture. This is not desirable in jacking-up operation.

SUMMARY OF THE INVENTION

Therefore, the present invention has the object to provide a suspension system for an automotive vehicle so adapted as to carry out jacking-up operation in a more desirable state by controlling a posture of the vehicle body by suspension control.

In order to achieve the aforesaid object, the present invention is basically so arranged as to slowly control a posture of the vehicle body by the suspension control in carrying out jacking-up operation. A specific process for carrying out a slow control over the posture of the vehicle body may involve making a control gain in control over the posture of the vehicle body smaller at the time of jacking up the wheel than at ordinary control time.

In accordance with the present invention, the control over the posture of the vehicle body is carried out slowly at the time of jacking up the wheel, so that a variation in load to be imposed upon the jack becomes slow even if only one of the wheels is jacked up, thereby avoiding undesirable feel during the jacking-up operation. It is to be noted as a matter of course that the control over the posture of the vehicle body is continued although slowly, so that even if the distribution of load upon the vehicle body would have been varied, the posture of the vehicle body can be retained in an appropriate position and this is preferred in carrying out the jacking-up operation.

It is preferred to take measures, for example, by raising a minimum lower limit of an inner pressure within the cylinder, inhibiting a fail decision to be made on account of an excessively large stroke of the wheel, and so on. These measures are taken in anticipation of the fact that the wheel stroke becomes larger because the wheel stroke is made considerably larger at the time of jacking up the wheel than at the time of ordinary running. The elevation of the minimum lower limit of the inner pressure within the cylinder can prevent the vehicle height of the wheel involved from being made too large and the wheel is prevented from rebounding to an excessive extent.

Other objects, features and advantages of the present invention will become apparent in the course of the description of the preferred embodiments, which follows, with reference to the accompanying drawings.

BRIEF DESCRIPTION OF THE DRAWINGS

FIGS. 3A and 3B are control block diagrams showing control for varying the suspension characteristics of the suspension system by a controller.

FIGS. 5 to 8 are flowcharts showing other processes for determining a jacked-up state of the vechicle body.

DESCRIPTION OF THE PREFERRED EMBODIMENTS

The present invention will be described more in detail with reference to the accompanying drawing.

Figure 1:
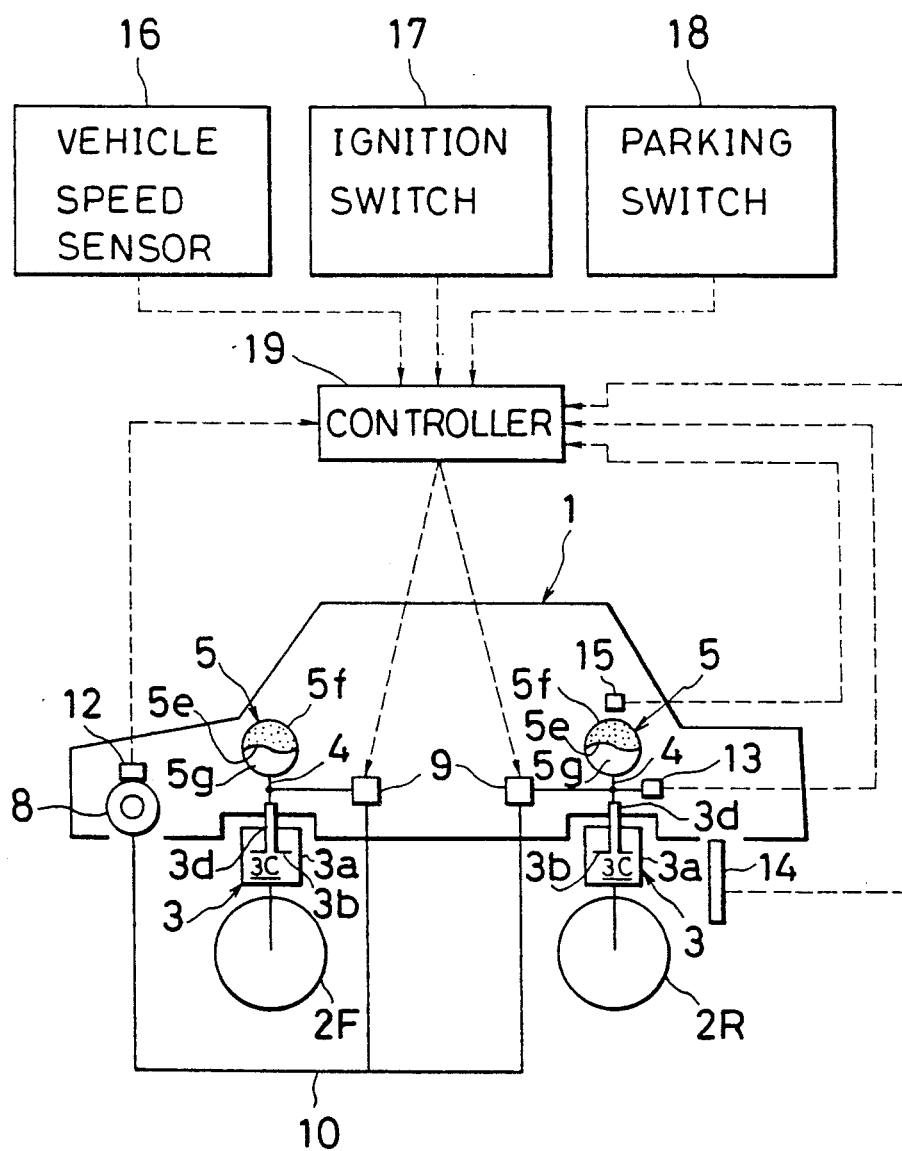
FIG. 1 is a diagrammatic representation of a whole layout of the suspension system according to the present invention.

Referring to FIG. 1, reference numeral 1 stands for an automotive vehicle body, reference numeral 2F for a front wheel, and reference numeral 2R for a rear wheel. Between the vehicle body 1 as sprang weight and each of the front wheel 2F and the rear wheel 2R as unsprung weight is interposed a liquid cylinder 3. Each of the liquid cylinders 3 is divided into or defined by a liquid pressure chamber 3c by a piston 3b inserted into a cylinder body 3a. An upper end portion of a connecting rod 3d connected to the piston 3b is connected to the automotive vehicle body 1 and the cylinder body 3a is connected to each of the front wheels 2F and the rear wheels 2R. More specifically, the inside of the cylinder body 3a constitutes substantially one liquid pressure chamber 3c regardless of the disposition of the piston 3b. In other words, the liquid pressure chamber 3c comprises an upper liquid pressure chamber section located above the piston 3b and a lower liquid pressure chamber section located underneath the piston 3b, and both of the two liquid pressure chamber sections are always communicated with each other through a communication hole or a cut-off portion formed on the piston 3b.

To the liquid pressure chamber 3c of each of the liquid cylinders 3 is connected through a communication passage 4 a gas spring 5 which in turn is divided into a gas chamber 5f and a liquid pressure chamber 5g by a diaphragm 5e and the liquid pressure chamber 5g is communicated with the liquid pressure chamber 3c of each of the liquid cylinders 3.

Figure 2:
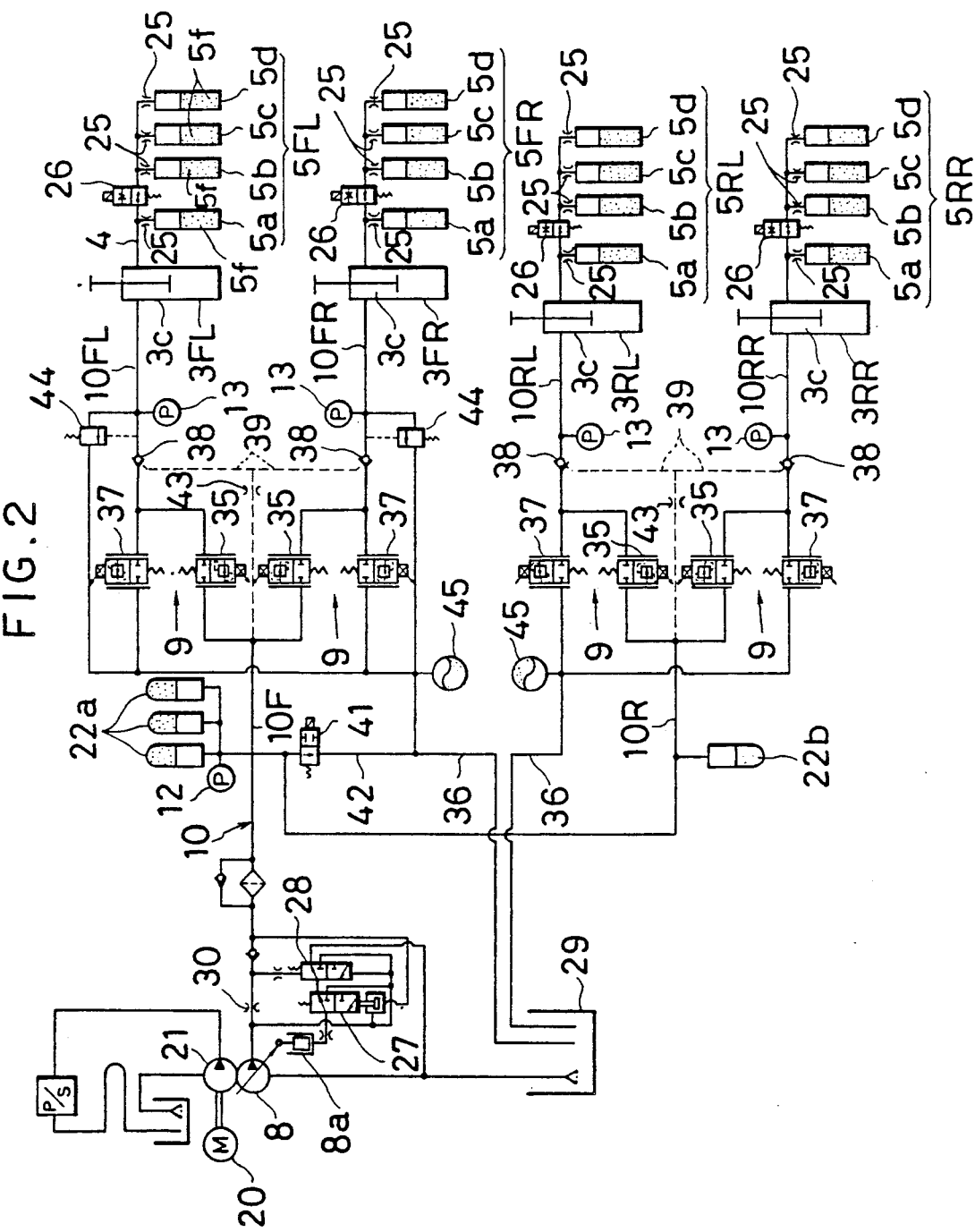
FIG. 2 is a circuit view showing a hydraulic pressure circuit according to the suspension system of the present invention.

As shown in FIG. 2, reference numeral 8 denotes a hydraulic pressure pump 8 which is communicated with each of the liquid cylinders 3 through a liquid pressure passage 10 as a high pressure line, and reference numeral 9 denotes a flow rate control valve which is mounted to the liquid pressure passage 10 and which has the function of adjusting an inner pressure, i.e. the liquid pressure within the liquid pressure chamber 3c, by supplying or discharging the liquid to or from each of liquid cylinders 3.

As further shown in FIG. 2, reference numeral 12 stands for a main pressure sensor for sensing the pressure for discharging the liquid of the hydraulic pressure pump 8, i.e. the pressure of the liquid accumulated in each of accumulators 22a and 22b, as will be described hereinafter in more detail, reference numeral 13 for a cylinder pressure sensor for sensing the liquid pressure of the liquid pressure chamber 3c of each of the liquid cylinders 3, reference numeral 14 for a vehicle height sensor for sensing a vehicle height, i.e. a cylinder stroke of slide, for each of the front wheels 2F and the rear wheels 2R, reference numeral 15 for a vertical acceleration sensor for sensing vertical acceleration of the automotive vehicle, i.e. sprang acceleration of the front wheels 2F and the rear wheels 2R. Reference numeral 16 for a vehicle speed sensor for sensing a vehicle speed of the automotive vehicle, reference numeral 17 for an ignition switch, and reference numeral 18 for a parking switch. The signals sensed by these sensors and the shift signals outputted from these switches are inputted into a controller 19 composed of a microcomputer having a CPU, etc., and they are employed for controlling changes of suspension characteristics.

FIG. 2 shows a hydraulic pressure circuit for controlling a supply or discharge of the liquid to or from the the liquid cylinders 3. As shown in FIG. 2, the hydraulic pressure pump 8 comprises a swash plate type piston pump of a variable volume type and it is connected in two rows to a hydraulic pressure pump 21 for power steering unit drivable by a driving source 20. With the liquid pressure passage 10 connected to the hydraulic pressure pump 8 are communicated three accumulators 22a, 22a and 22a at identical sites at which the liquid pressure passage 10 is in turn branched into a front wheel liquid pressure passage 10F and a rear wheel liquid pressure 10R. The front wheel liquid pressure passage 10F is further branched into a left-hand front wheel liquid pressure passage 10FL and a right-hand front wheel liquid pressure 10FR. The front wheel liquid pressure passage 10FL is communicated with the liquid pressure chamber 3c of a left-hand liquid cylinder 3FL of the respective wheel while the right-hand front wheel liquid pressure passage 10FR is communicated with the liquid pressure chamber 3c of a right-hand liquid cylinder 3FR of the respective wheel. On the other hand, the rear wheel liquid pressure passage 10R is communicated with one accumulator 22b and it is divided into a left-hand rear wheel liquid pressure 10RL and a right-hand rear wheel liquid pressure 10RR on the downstream side of the accumulator 22b. The left-hand rear wheel liquid pressure passage 10RL is communicated with the liquid pressure chamber 3c of the left-hand rear liquid cylinder 3RL of the respective wheel while the right-hand rear wheel liquid pressure passage 10RR is communicated with the liquid pressure chamber 3c of the right-hand rear liquid pressure passage 3RR thereof.

Each of the liquid cylinder 3FL, 3FR, 3RL and 3RR is connected to a plurality of gas springs 5FL, 5FR, 5RL and 5RR, respectively. For each of the gas springs 5FL, 5FR, 5RR and 5RL, in this embodiment, there are provided four of the gas springs 5a, 5b, 5c and 5d, i.e. first gas spring 5a, second gas spring 5b, third gas spring 5c, and fourth gas spring 5d, for example, which are disposed in parallel to each other and communicated with the liquid pressure chamber 3c of the respective liquid cylinder 3 through the communication passage 4. Each of the gas springs 5a, 5b, 5c and 5d are provided with an orifice 25 at its branch portion of the communication passage 4, and the orifice 25 is so disposed as to exhibit both its damping action and buffer action in association with gas filled in the gas chamber 5f. The communication passage 4 is provided in a position between the first gas spring 5a and the second gas spring 5b with a damping-force shifting valve 26 for adjusting a passage area of the communication passage 4 and the damping-force shifting valve 26 is so arranged as to assume two positions, an open position in which the communication passage 4 is opened and a closed position in which the passage area of the communication passage 4 is restricted to a remarkable extent.

To the liquid pressure passage 10 are connected an unload valve 27 and a flow a rate control valve 28 on the upstream side of the accumulator 22a. The unload valve 27 is so arranged as to assume a supply position and a discharge position. More specifically, when the unload valve 27 assumes its supply position, on the one hand, the amount of the liquid to be discharged from the hydraulic pressure pump 8 is reduced by introducing the pressure liquid to be discharged from the hydraulic pressure pump 8 into a swash-plate operating cylinder 8a of the hydraulic pressure pump 8. When the unload valve 27 assumes its closed position, on the other hand, the pressure liquid within the cylinder 8a is discharged. And the unload valve 27 is further so arranged as to shift its position from the discharge position to the supply position when the pressure at which the liquid is discharged from the hydraulic pressure pump 8 exceeds a predetermined upper limit discharge liquid pressure, i.e. $160 \pm 10$ kgf/cm$^2$, and then as to maintain its state until the liquid pressure reaches a predetermined lower limit discharge liquid pressure, e.g. $120 \pm 10$ kgf/cm$^2$, or lower. In other words, the unload valve 27 exhibits the function of controlling the discharge liquid pressure of the hydraulic pressure pump 8 within a predetermined range from 120 kgf/cm$^2$ to 160 kgf/cm$^2$. The flow rate control valve 28 is so arranged as to assume both of a supply position in which the pressure oil is introduced from the hydraulic pressure pump 8 to the swash-plate operating cylinder 8a through the unload valve 27, and a discharge position in which the pressure oil within the cylinder 8a is discharged from the unload valve 27 to a reserve tank 29. This flow rate control valve 28 functions as controlling the amount of the liquid discharged from the hydraulic pressure pump 8 to a constant level by constantly retaining the differential pressure between the upstream side and the downstream side at the portion where a restrictor 30 for the liquid pressure passage 10 is disposed, when the liquid discharge pressure of the hydraulic pressure pump 8 is retained within the predetermined range by the unload valve 27. Hence, the liquid is supplied as a main pressure to each of the liquid cylinders 3 by accumulating the liquid for the accumulators 22a and 22b.

Four of the flow rate control valves 9 are disposed on the downstream side of the accumulator 22a of the liquid pressure passage 10 so as to correspond to the four wheels, respectively. It is noted herein that, since the construction of the portion corresponding to each of the wheels is identical to each other, only the left-hand front wheels are described while description of the other will be omitted. The flow rate control valve 9 comprises an inflow valve 35 disposed on the left-hand liquid pressure passage 10FL of the liquid pressure passage 10, and a discharge valve 37 disposed on a low pressure line 36 for discharging the liquid or oil from the left-hand liquid pressure passage 10FL to the reserve tank 29. Each of the inflow valve 35 and the discharge valve 37 is so arranged as to assume two positions, i.e. an open position and a closed position, and has a differential pressure valve built therein in order to retain the liquid pressure at its open position at a predetermined value.

On the left-hand liquid pressure passage 10FL extending between the inflow valve 35 and the left-hand front liquid cylinder 3FL, there is disposed a check valve 38 of a type operative in response to pilot pressure. The check valve 38 is so disposed as to be closed when the pilot pressure reaches 40 kgf/cm$^2$ or lower by introducing the oil pressure, i.e. main pressure, as a pilot pressure, within the liquid pressure passage 10 on the upstream side of the inflow valve 35 of the inflow rate control valve 9 through a pilot line 39. In other words, only when the main pressure is higher than 40 kgf/cm$^2$, the pressure oil can be supplied to the liquid cylinder 3 as well as the liquid or oil within the liquid cylinder 3 can be discharged.

As shown in FIG. 2, reference numeral 41 denotes a fail safe valve so disposed on the communication passage 42 communicating the liquid pressure passage 10 on the downstream side of the accumulator 22a with the low pressure line 36 as to function as releasing a high pressure state by returning the oil accumlated in the accumulators 22a and 22b to the reserve tank 29 by shifting to its open position at the time of an incident. Reference numeral 43 denotes a restrictor so disposed on the pilot line 39 as to have the function of delaying the closing of the check valve 38 at the time when the fail safe valve 41 is operated to open. Further, reference numeral 44 denotes a relief valve capable of returning the liquid or oil to the low pressure line 36 by operating to open when the oil pressure of the liquid pressure chamber 3c of each of the left-hand front liquid cylinder 3FL and the right-hand front liquid cylinder 3FR is raised to an abnormally high level. Reference numeral 45 denotes a return accumulator so connected to the low pressure line 36 as to perform the action of accumlating the liquid or oil when the liquid or oil is discharged from the liquid chamber 3.

Description will be made of control over a variation in the suspension characteristics by the controller 19 by supplying or discharging the liquid to or from each of the liquid cylinders 3 with reference to FIGS. 3A and 3B.

Figure 3B:
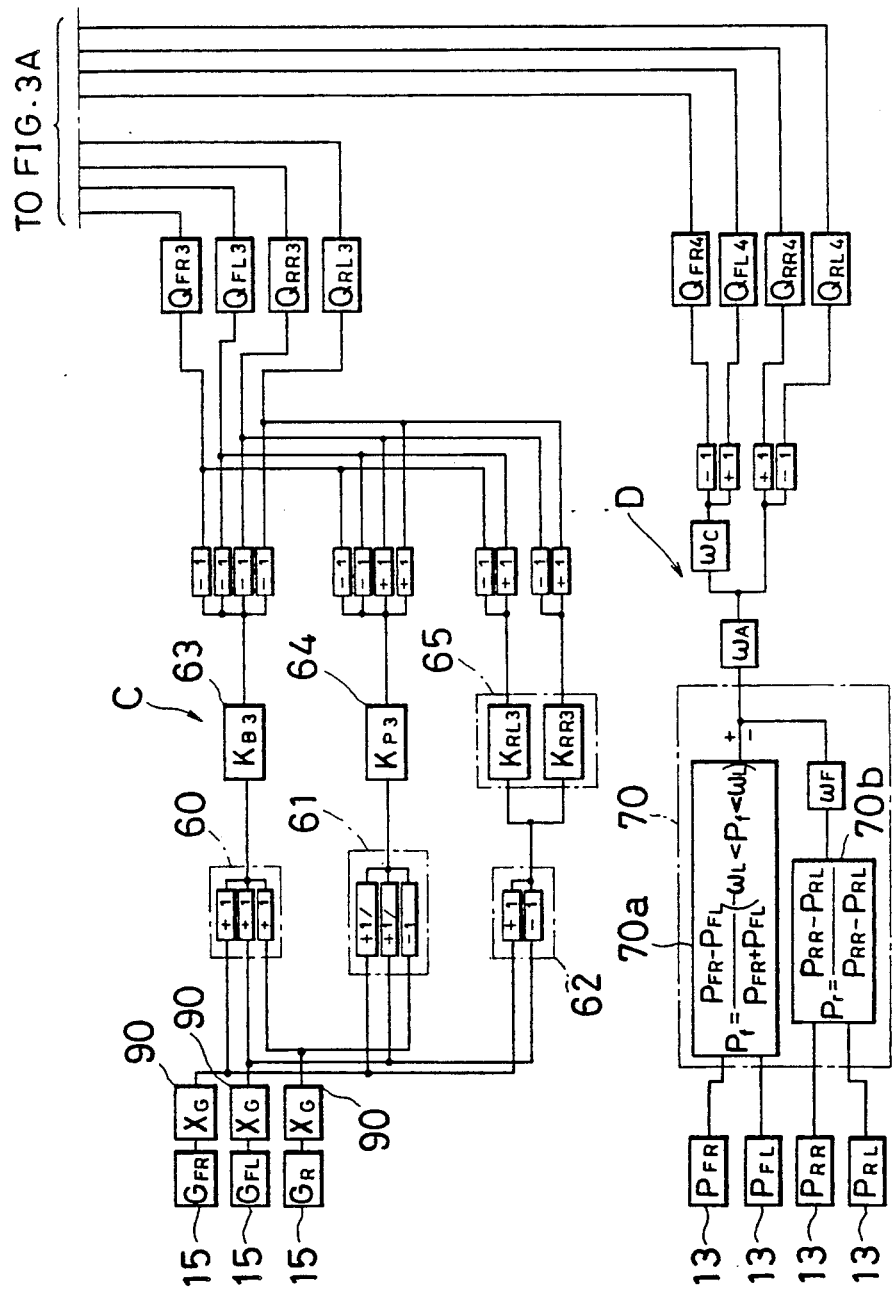

As shown in FIGS. 3A and 3B, the supply or discharge of the liquid to or from liquid cylinders 3 is carried out by a control system A for controlling the vehicle height to a target vehicle height, a control system B for suppressing a speed of displacing the vehicle height, a control system C for reducing vibration in the vehicle direction of the vehicle body, and a control system D for suppressing a wrap of the vehicle body. The control system A is so arranged as to control the vechile height of the vehicle body to the target the vehicle height on the basis of signals indicative of displacement of the vehicle height, XFR, XFL, XRR and XRL, detected by the vehicle height sensor 14 of each of the wheels and the control system B is so arranged as to suppress the speed of displacing the vehicle height on the bisis of signals indicative of speeds of displacement of the vehicle height, or vehicle height displacement speeds YFR, YFL, YRR and YRL, obtainable by differentiating the signals indicative of displacement of the vehicle height, XFR, XFL, XRR and XRL. The control system C is so arranged as to reduce the vertical vibration of the vehicle body on the basis of signals indicative of vertical acceleration, GFR, GFL, and GR, detected by three of the vertical acceleration sensors 15. The control system D is so arranged as to suppress the wrap of the vehicle body operating signals indicative of pressure, PFR, PFL, PRR and PRL, detected by the liquid pressure sensor 13 disposed at each of the wheels.

In the control system A, reference numeral 50 denotes a bounce component operating section for operating a bounce component of the vehicle body by adding the sum of outputs XFR and XFL from the vehicle height sensors 14 on the side of the right-hand and left-hand front wheels 2F and the sum of outputs XRR and XRL from the vehicle height sensors 14 on the side of the right-hand and left-hand rear wheels 2R, and reference numeral 51 denotes a pitch component operating section for operating a pitch component of the vehicle body by subtracting the sum of the outputs XRR and XRL on the side of the right-hand and left-hand rear wheels 2R from the sum of the outputs XFR and XFL on the side of the right-hand and left-hand front wheels 2F. Further, reference numeral 52 denotes a roll component operating section for operating a roll component of the vehicle body by adding the difference XFR-XFL between the outputs XFR and XFL on the side of the right-hand and left-hand front wheels 2F and the difference XRR-XRL between the outputs XRR and XRL on the side of the right-hand and left-hand rear wheels 2R.

Furthermore, reference numeral 53 denotes a bounce control section for operating an amount of the liquid or oil to be supplied to liquid cylinder of each of the wheels for controlling the bounce component of the vehicle body, on the basis of a gain value KB1 obtainable by inputting the bounce component operated by the bounce component operating section 50 and a target average vehicle height TH. Reference numeral 54 denotes a pitch control section for operating an amount of the liquid or oil to be supplied to liquid cylinder of each of the wheels for controlling the pitch component of the vehicle body, on the basis of a gain valve KB2 obtainable by inputting the pitch component operated by the pitch component operating section 51. Reference numeral 55 denotes a roll control section by inputting the roll component operated by the roll component operating section 52 and a target roll displacement amount TR and by operating an amount of the liquid or oil to be supplied to liquid cylinder of each of the wheels so as to allow the vehicle height to correspond to the target roll displacement amount TR on the basis of gain values KRF1 and KRR1.

Each of control amounts operated by the bounce control section 53, the pitch control section 54 and the roll control section 55 is processed by reversing its plus and minus for each of the wheels. In other words, the plus and minus of the signals indicative of the vehicle height displacement, XFR, XFL, XRR and XRL, detected by the vehicle height sensors 14 are reversed. Then, the bounce control amount, the pitch control amount ant the roll control amount for each wheel are added to give flow rate signals QFR1, QFL1, QRR1 and QRL1 for each of the flow rate valves 9 of the respective wheels.

It is to be noted herein that an insensitive unit is disposed between each of the vehicle height sensors 14 and elements 40, 41 and 42, thereby permitting the vehicle height displacement signals, XFR, XFL, XRR and XRL, to be outputted to the bounce component operating section 50, the pitch component operating section 51 and the roll component operating section 52, only when the vehicle height displacement signals XFR, XFL, XRR and XRL from each of the vehicle height sensors 14 surpasses an insensitive zone XH.

The control system B has four of differentiators 56 for differentiating each of the vehicle height displacement signals XFR, XFL, XRR and XRL inputted from the vehicle height sensors 14 and operating the vehicle-height displacement-speed signals YFR, YFL, YRR and YRL by the following formula:

$$Y = (X_n - X_{n-1})/T$$

where $X_n$ is an amount of displacement of the vehicle height at the time point t;

$X_{n-1}$ is an amount of displacement of the vehicle height at the time t−1; and T is a sampling time.

In the control system B, reference numeral 57a denotes a pitch component operating section for operating the pitch component of the vehicle body by subtracting the sum of the vehicle height displacement speed signals YRR and YRL on the side of the right-hand and left-hand rear wheels 2R from the sum of the vehicle-height displacement-speed signals YFL and YFR on the side of the left-hand and right-hand front wheels 2F, and reference numerals 57b denotes a roll component operating section for operating the roll components of the vehicle body by adding the difference YFR-YFL between the vehicle-height displacement-speed signals YFL and YFR on the side of the left-hand and right-hand front wheels 2F to the difference YRR-YRL between the vehicle height displacement speed signals YRR and YRL on the side of the right-hand and left-hand rear wheels 2R.

The pitch component calculated by the pitch component operating section 57a is inputted into a pitch control section 58 and a flow rate control amount for each of proportional flow rate control valves 9 for controlling the pitch is operated on the basis of a gain Kp2. On the other hand, the roll component calculated by the roll component operating section 57b is inputted into a roll control section 59 and a flow rate control amount for each of the proportional flow rate control valves 9 for controlling the roll component is operated on the basis of gains KRF2 and KRR2. Each of the control amounts operated by the pitch control sections 58 and the roll control sections 59 is processed such that its plus and minus of the control amount for each of the wheels are reversed to its opposite sign. In other words, the plus and minus of each of the vehicle height displacement speed signals YFR, YFL YRR and YRL operated by each of the differentiators 56 are reversed to its opposite sign. Thereafter, the pitch control amount and the roll control amount for each wheel are added to give flow rate signals QFR2, QFL2, QRR2 and QRL2 to each of the proportional flow rate control valves 9 for the respective wheels in the control system B.

In the control system C, reference numeral 60 stands for a bounce component operating section for operating a bounce control of the the vehicle body by adding outputs GFR, GFL and GR of the respective vertical acceleration sensors 15, and reference numeral 61 stands for a pitch component operating section for operating a pitch component of the vehicle body by subtracting an output GR of the vehicle acceleration sensor 15 disposed in a transversely center portion between the left-hand and right-hand rear wheels 2R from a half of the sum of outputs of the vertical acceleration sensors 15 and 15 mounted over the right-hand and left-hand front wheels 2F, i.e. (GFR+GFL)/2. Reference numeral 62 denotes a roll component operating section for operating a roll component of the vehicle body by subtracting the output GFL of the vertical acceleration 15 on the side of the left-hand front wheel from the output GFR of the vertical acceleration 15 on the right-hand front wheel. Reference numeral 63 denotes a bounce control section for operating a control amount of the liquid to each of the proportional flow rate control valves 9 in the pitch control on the basis of a gain KB3 by inputting an operation value of the bounce component operated by the bounce component operating section 60, and reference numeral 64 denotes a pitch control section for operating a control amount of the liquid to each of the proportional flow rate control valves 9 for controlling the pitching on the basis of a gain KP3 by inputting an operation value of the pitch component operated by the pitch componet operating section 61. Further, reference numeral 65 denotes a roll control section for operating a control amount of the liquid to each of the porportional flow rate control valves 9 for the roll control, on the basis of gains KRF3 and KRR3 by inputting an operation value of the pitch component operated by the roll component operating section 62.

The plus and minus of the control amounts a operated and calculated by the bounce control section 63, the pitch control section 64 and the roll control section 65 are reversed for each of the wheels to their opposite signs and thereafter each of the bounce, pitch and roll control amounts is added together for each wheel, thereby giving flow rate signals QFR3, QFL3, QRR3 and QRL3 to each of proportional flow rate control valves 9 for the respective wheels to be outputted from the control system C.

It is noted herein that an insensitive unit 90 is provided between each of the vertical acceleration sensors 15 and the bounce component operating section 60, the pitch component operating section 61 and the roll component operating section 62 so as to generate the vertical acceleration signals GFR, GFL and GR to the bounce component operating section 60, the pitch component operating section 61 and the roll component operating section 62, respectively, only when the vertical acceleration signals GFR, GFL and GR outputted from the respective vertical acceleration sensors 15 surpasses such a preset insenitive zone XG.

In the control system D, reference numeral 70 stands for a warp control section having a front wheel liquid pressure ratio operating section 70a and a rear wheel liquid pressure ratio operating section 70b. The front wheel liquid pressure ratio operating section 70a of the warp control section 70 is so arranged as to operate a ratio in liquid pressure of the difference, PFR−PFL, to the sum, PFR+PFL, i.e. Pf=(PFR−PFL)/(PFR+PFL), on the basis of signals, PFL and PFR, indicative of liquid pressures, inputted from the liquid pressure sensors of the respective liquid cylinder 3 on the side of the left-hand and right-hand front wheels 2F. Further, this front wheel liquid pressure ratio operating section 70a is so constructed as to generate the resulting liquid pressure ratio Pf, as it is, when the liquid pressure ratio Pf has the following relationship with a threshold liquid pressure ratio $\omega L$: $-107 L < Pf < +\omega L$, and as to generate the threshold liquid pressure ratio, i.e. $-\omega L$ or $+\omega L$, when the liquid pressure ratio Pf has the following relationship with the threshold liquid pressure ratio $\omega L$: $Pf < -\omega L$ or $Pf > +\omega L$, respectively. On the other hand, the rear wheel liquid pressure ratio operating section 70b of the warp control section 70 is to operate a ratio in liquid pressure of the difference, PRR-PRL, to the sum, PRR+PRL, i.e. Pr=(PRR−PRL)/(PRR+PRL), on the basis of the signals, PRR amd PRL, indicative of liquid pressures, inputted from the liquid pressure sensors 13 and 13 of the respective liquid cylinders 3 on the side of the right-hand and left-hand rear wheels 2R.

Then, the warp control section 70 increases the liquid pressure ratio Pr on the rear wheel side by predetermined times on the basis of a gain $\omega F$ and thereafter substracts the resulting product from the liquid pressure ratio Pf on the front wheel side. The output from this warp control section 70 is multiplied by a gain $\omega A$ and thereafter multiplied by a gain $\omega C$ on the front wheel side. Further, the control amount of the liquid to be supplied to each wheel is processed in such a manner that its plus and minus signs are reversed so as to allow their signs to become opposite between the left-hand and right-hand wheels, thereby giving flow rate signals QFR4, QFL4, QRR4 and QRL4 to the respective proportional flow rate control valves 9.

The resulting flow rate signals to each of the proportional flow rate control valves 9 in the control systems A, B, C and D are then added to each other for each wheel, thereby finally yielding a total flow rate signals QFR, QFL, QRR and QRL to each of the proportional flow rate control valves 9 in the control system D.

The following table indicates an example of a map for control gains prestored in the controller 19 so as to be employed in each of the control systems A, B, C and D. As is apparent from the table below, seven of modes are set in accordance with a running state of the automotive vehicle.

| Control Gain | Mode 1 | 2 | 3 | 4 | 5 | 6 | 7 | Unit |
|---|---|---|---|---|---|---|---|---|
| KB1 | 0.02 | ← | ← | ← | ← | ← | ← | L/mm |
| KP1 | 0.02 | ← | ← | ← | ← | ← | ← | L/mm |
| KRF1 | 0.04 | ← | ← | ← | ← | ← | ← | L/mm |
| KRR1 | 0.04 | ← | ← | ← | ← | ← | ← | L/mm |
| KP2 | 0 | 0.05 | 0 | 0 | 0 | 0 | 0 | L/(mm/sec) |
| KRF2 | 0 | 0 | 0 | 0.03 | 0.05 | 0.07 | 0.03 | L/(mm/sec) |
| KRR2 | 0 | 0 | 0 | 0.03 | 0.05 | 0.07 | 0.03 | L/(mm/sec) |
| KB3 | 5 | 20 | 10 | 12 | 15 | 15 | 12 | L/G |
| KP3 | 5 | 20 | 10 | 12 | 15 | 15 | 12 | L/G |
| KRF3 | 5 | 15 | 15 | 20 | 30 | 40 | 20 | L/G |
| KRR3 | 5 | 15 | | 20 | 30 | 40 | 20 | L/G |
| $\omega A$ | 250 | ← | ← | ← | 350 | ← | 250 | — |
| $\omega F$ | 1 | ← | ← | ← | 1.2 | ← | 1 | — |
| $\omega L$ | 0.5 | ← | ← | ← | ← | ← | ← | — |
| $\omega C$ | 1 | ← | ← | ← | ← | ← | ← | — |
| XH | 5 | 1 | ← | ← | 5 | ← | 1 | mm |
| XG | 0.05 | 0 | ← | ← | ← | ← | ← | G |
| TH | 0 | ← | ← | ← | ← | ← | ← | mm |
| TR | 0 | ← | ← | ← | 5 | 3 | 10 | mm |
| QMAX | 5 | 18 | ← | ← | ← | ← | ← | L |
| PMAX | 110 | ← | ← | ← | ← | ← | ← | kgf/cm$^2$ |
| PMIN | 30 | ← | ← | ← | ← | ← | ← | kgf/cm$^2$ |

L = liter/minute

In the above table, mode 1 indicates a value of each control gain during 60 seconds after stop of the engine, and mode 2 indicates a value of each control gain in such a state that, although an ignition switch is turned on, the vehicle is stopped and the vehicle speed is zero. Mode 3 indicates indicates a value of each control gain in a state in which the vehicle is running straight at lateral acceleration Gs as low as 0.1 or less. Mode 4 indicates a value of each control gain in such a state that the vehicle is cornering slowly at lateral acceleration Gs which exceeds 0.1 yet as high as 0.3 or less. Mode 5 indicates a value of each control gain in a state in which the vehicle is cornering to a medium extent at lateral acceleration as low as 0.3 yet as high as 0.5 or less. Mode 6 indicates a value of each control gain in such a state that the vehicle is cornering rapidly at lateral acceleration exceeding 0.5. Further, mode 7 indicates a value of each control gain to be selected in place of mode 4 in such a state that the vehicle is cornering slowly at lateral acceleration Gs of the vehicle as low as 0.1 yet as high as 0.3 or less, when a reverse roll mode is selected by a roll mode selecting switch (not shown). And the mode 7 is automatically shifted to mode 4 when the vehicle speed reaches 120 km per hour or higher, even if the reverse roll mode would be selected.

In the table above, reference symbol Qmax indicates a maximum flow rate control amount to be supplied to the proportional flow rate control valve 9 for each wheel, and Pmax indicates a maximum pressure within the liquid pressure chamber 3c of the liquid cylinder 3, which is so set as to cause no liquid to flow backwards into the accumulators 22 from the liquid pressure chamber 3c of the liquid cylinder 3. Reference symbol Pmin indicates a minimum pressure within the liquid pressure chamber 3c of the liquid cylinder 3, which is so set as to cause the gas spring 5 no damage by decreasing the pressure within the liquid pressure chamber 3c of the liquid cylinder 3 to an excessive extent and stretching the gas spring 5 to its full length. Further, the arrow signs in the table above indicate that the control gains are set by the same values as those pointed by them. In the table above, too, each of the control gains is so set as to perform suspension control with more attention paid to running stability as the mode number gets greater, except mode 7.

Figure 4:
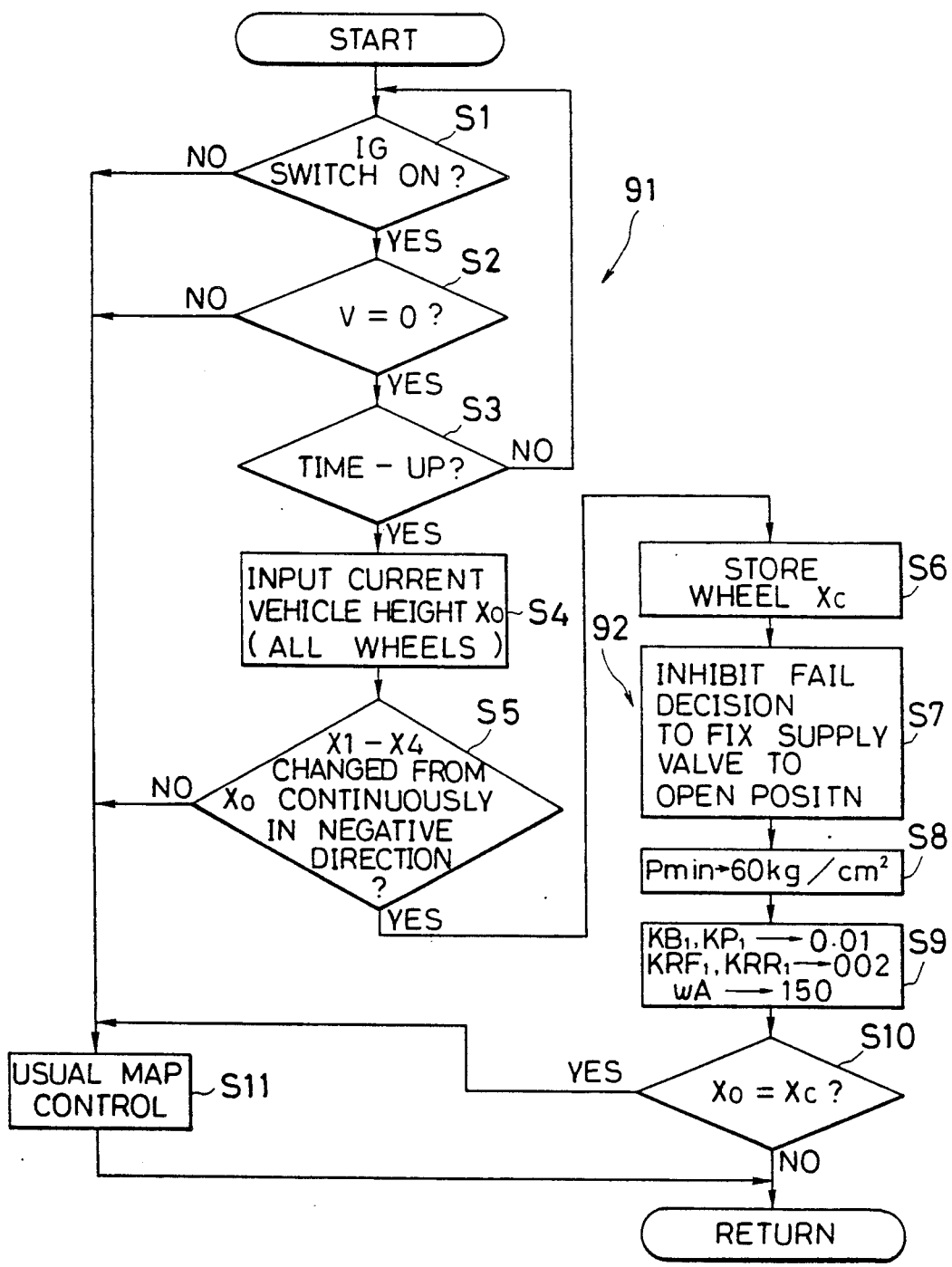
FIG. 4 is a flowchart showing control over an active suspension control by the controller at the time of jacking up the vehicle body.

FIG. 4 shows active suspension control to be performed by the controller 19 during occurrence of a jack-up phenomenon by supplying or discharging the liquid to or from each of the liquid cylinders 3.

In this active suspension control, first, a decision is made at step S1 to determine if the ignition switch 17 is shifted to its ON state on the basis of a shift signals of the ignition switch 17, followed by proceeding to step S2 at which a decision is further made to determine if the current vehicle speed of the vehicle is zero on the basis of the signal detected by the vehicle speed sensor 16. When it is decided at step S1 that the ignition switch 17 is turned on and at step S2 that the current vehicle speed is zero, or when it is decided at steps S1 and S2 that the vehicle is in a parking state although the engine is operating, then the program flow goes to step S3 at which a decision is made to determine if the time is counted up until a given time period has been elapsed. When it is decided at step S3 that the given time period has been elapsed, then the program flow goes to step S4 at which the signals detected by the vehicle height sensors 14 for all four wheels, or a current vehicle height X0, are inputted. Then, at step S5, a decision is made to determine if the wheels X1, X2, X3 and X4 are continuously changing from the current vehicle height X0 in the negative direction, i.e. in the rebounding direction. In other words, it is decided to determine whether or not a stroke of the liquid cylinder 3 is continuously changing in the direction in which it expands. The steps S1 to S5 and the vehicle speed sensor 16 and the vehicle height sensors 14 to be employed for decisions at the steps S1 to S5 constitutes jacked-up state detecting means 91 for detecting a jacked-up state of the vehicle body.

It is also noted that, at step S3, a decision may be made to determine if the parking switch 18 is turned on on the basis of a switch signal of the parking switch 18, in place of the time being counted up, followed by proceeding to step S4 when the parking switch 18 is turned on. Further, at step S5, a decision may be made to determine if each of the wheels P1 to P4 is changed from a current cylinder pressure P0 in the negative direction or in the direction of decreasing the pressure by a predetermined value or higher, in place of decision being made to determine if each of the wheels X1 to X4 is continuously changing from the current vehicle height X0 in the negative direction or in the rebounding direction.

When the decisions at all steps S1, S2 and S5 are in the affirmative, that is, when the vehicle body is jacked up while it is parking and a stroke of the liquid cylinder 3 of either one of the wheels is changing in the extending direction continuously or by the predetermined value or larger, then the program flow goes to step S6 at which the wheel Xc jacked up is stored. Then, at step S7, a fail decision as to whether the supply valve 35 is fixed to its open position (FIG. 2) is suspended, followed by proceeding to step S8 at which the minimum pressure Pmin within the liquid pressure chamber 3 of the liquid cylinder 3 is changed to 60 kgf/cm$^2$ from the value (30 kgf/cm$^2$) as shown in a map of the control gains in the table above. Then, at step S9, the control gains KB1 and KP1 of the control system A for controlling the vehicle height are changed to 0.01 and the control gains KRF1 and KRR1 for controlling the vehicle height are changed to 0.02, while the control gains ⅔A in the control system D for suppressing the warp of the vehicle body is changed to 150. In other words, these control gains are changed in the direction of decreasing. The steps S7 to S9 constitute mode changing means 92 for changing control over the supplying or discharging of the liquid to or from each of the liquid cylinders 3 from its ordinary control mode to its jack-up mode when the vehicle body is jacked up. It is noted herein that the fail decision is to selectively execute a mode for suspending the control by maintaining the current vehicle height of the vehicle body, a mode for decreasing the vehicle height by discharging the liquid within the liquid cylinder 3 or other modes, accordance with a degree of the incident, while detecting an incident of instrument in the system for supplying or discharging the liquid, such as sensors and valves.

Thereafter, at step S10, a decision is made to determine if the wheel Xc jacked up has reached the current vehicle height X0. When the result of decision at step S10 indicates that the wheel Xc jacked up did not yet reach the current vehicle height X0, then the flow is returned.

When either of the decision at step S1, S2 or S5 is in the negative, then the program flow goes to step S11 at which ordinary active suspension control is performed on the basis of a map of the control gains. When the result of decision at step S10 indicates that the wheel Xc jacked up has reached the current vehicle height X0, then the program flow goes to step S11 at which ordinary active suspension control is carried out.

When the vehicle body is jacked up, the jacked-up state detecting means 91 detects its jacked-up state and the mode changing means 92 changes the control over the supply or discharge of the liquid to the liquid cylinder 3 from the ordinary control mode to the jack-up mode for appropriately dealing with the jacked-up state of the vehicle body. In other words, as the fail decision as to fixing the supply valve 35 to its open position is suspended, i.e. a decision being made as fail when there is detected the state in which the vehicle height keeps extending regardless of control over the discharge of the liquid, the mode for decreasing the vehicle height by discharging the liquid within the liquid cylinder 3, is beforehand prevented from being selected by the fail decision. Also, as the minimum pressure Pmin within the liquid pressure chamber 3c of the liquid cylinder 3 is elevated to a higher extent when the vehicle body is jacked up than when ordinary active suspension control is performed, a temporary decrease in the vehicle height is prevented when a jack is removed. Further, since the control gains KB1, KP1, KRR1 and KRF1 as well as ωA are changed to smaller values when the vehicle body is jacked up than when ordinary active suspension control is performed, a rapid change in the vehicle height and the pressure by the active suspension control is prevented. Furthermore, sensitivity to stability in posture of the vehicle body is decreased, so that an increase in operating force and damages of the jack can be prevented, while operation of jacking up the vehicle body can be performed with ease.

Although the present invention is not restricted to the embodiments as described hereinabove, it is to be understood as a matter of course that various changes and modifications are contained within the scope and spirit of the present invention. In this embodiment, as descibed hereinabove, the jacked-up state detecting means 91 for detecting the jacked-up state of the vehicle body is so constructed as to determine the jacked-up state when the ignition switch 17 is turned on yet the vehicle speed is zero and the stroke of the liquid cylinder 3 is extending continuously or by the predetermined value or more. Alternatively, the jacked-up state may be detected directly by a manual switch, a switch for detecting mounting or detachment of a jack, a jack-up switch for detecting the mounting of the jack, or the like, or indirectly by a decrease in liquid pressure of the liquid cylinder 3 to be caused by load imposed upon each of the wheels due to the jacking-up operation of the vehicle body.

FIGS. 5 to 8 show other procedures for determining the jacked-up state of the vehicle body.

Figure 5:
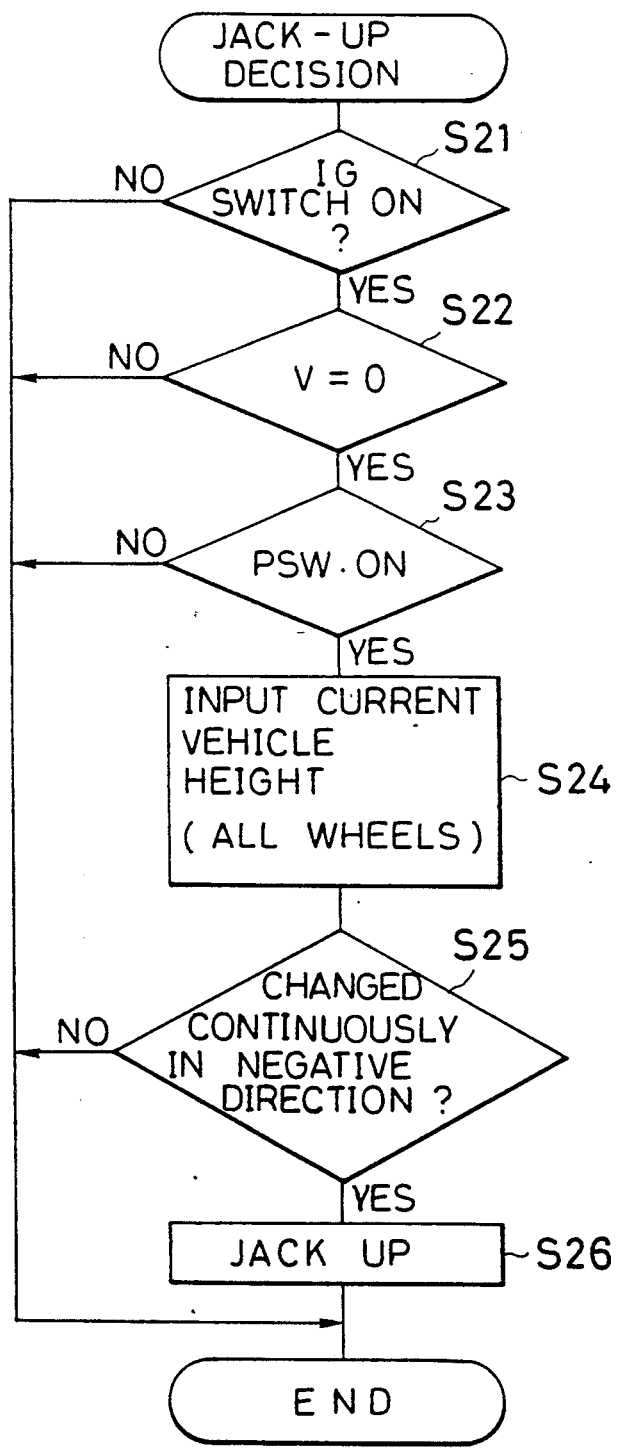

As shown in FIG. 5, steps 21 and 22 correspond to steps 1 and 2 in FIG. 4 while steps 24 and 25 correspond to steps 4 and 5 therein, respectively. And decision at step S23 in FIG. 5 is made in place of step S3 in FIG. 4. In other words, decision at step S23 is made to determine if a parking brake switch is turned on or a parking brake is operating and, when the result of this decision indicates that the parking brake switch is turned on, the jacked-up state is determined at step S26.

Figure 6:
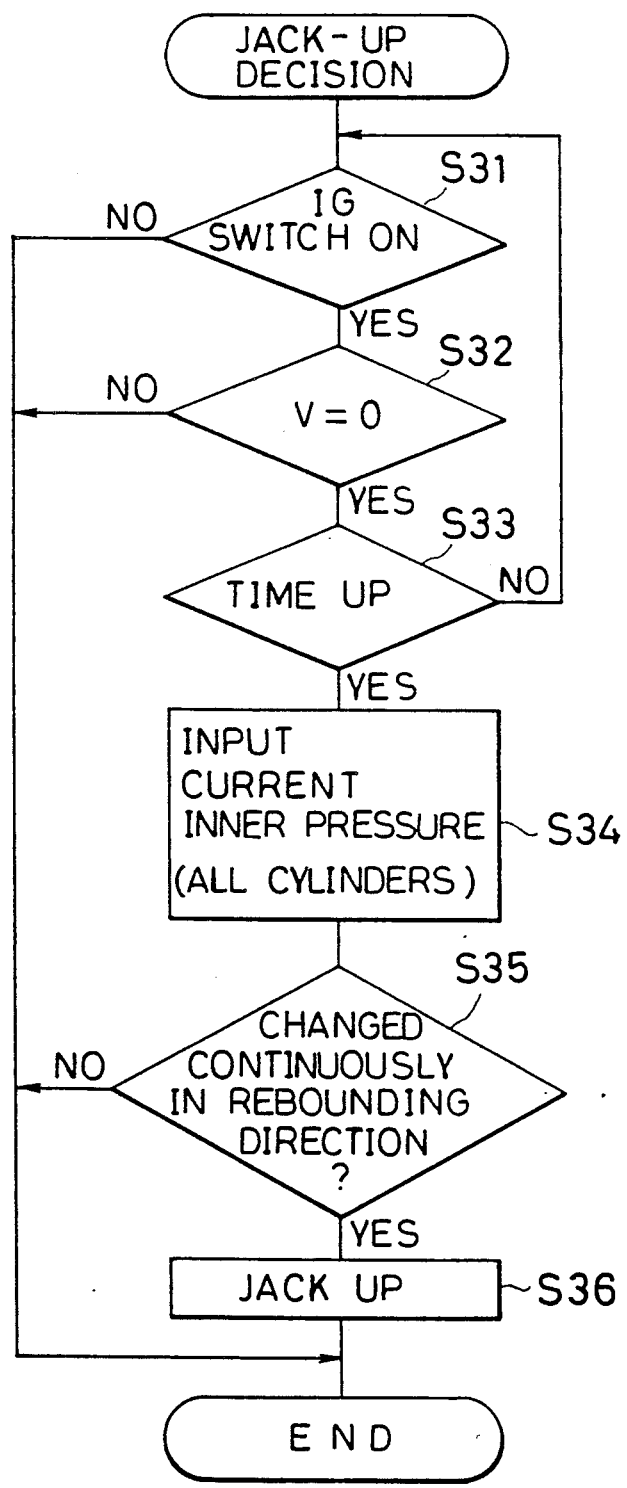

In the flowchart of FIG. 6, steps S31 to S33 correspond to steps 1 to 3 in FIG. 4, respectively. At step S34, the inner pressure within each of the liquid cylinders 3 is detected, followed by step S35 at which a decision is made to determine if the inner pressure detected is continuously decreasing and step S36 at which the jacked-up state is determined when the result of decision at step S35 indicates that the inner pressure is continuously decreasing.

Figure 7:
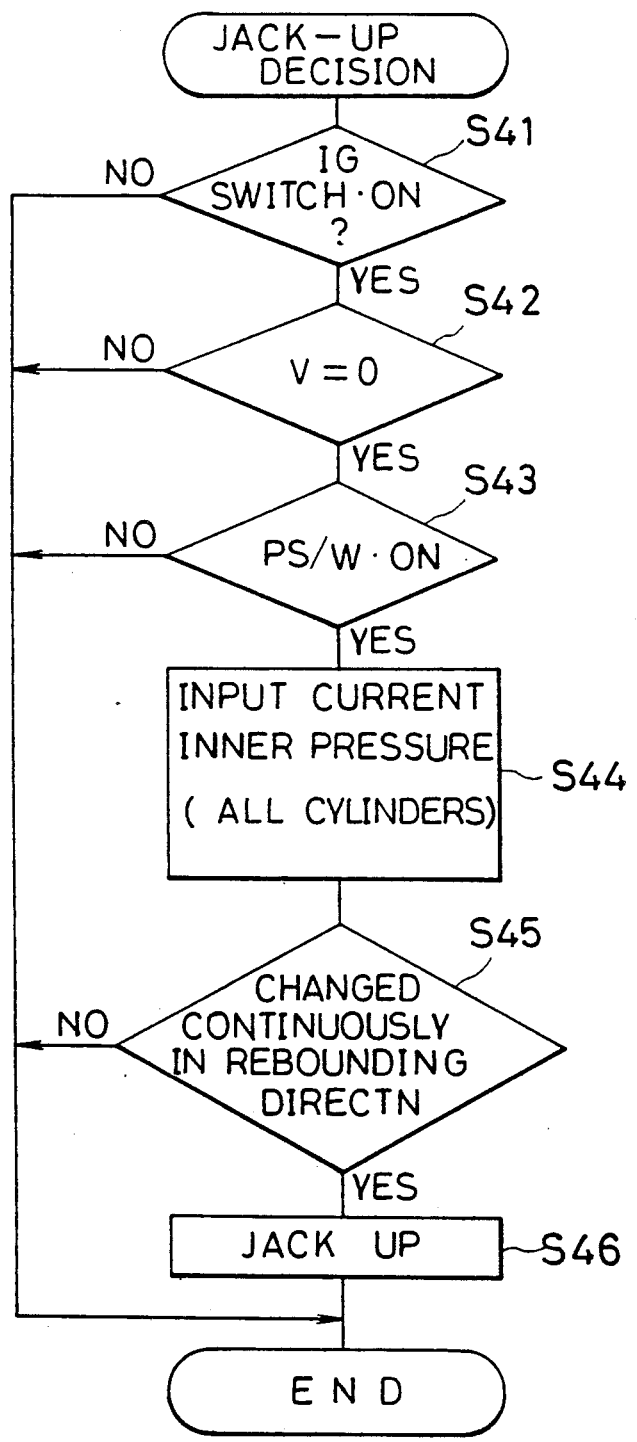

The flowchart in FIG. 7 is the same as in FIG. 6 except for using step S43 in place of step S33 of FIG. 6.

Further, as shown in FIG. 8, the jacked-up state is determined when the parking switch is turned on by the result of decision at step S51 and when the vehicle speed is zero by the result of decision at step S52. Further, in FIG. 8, a condition as to whether the ignition switch is turned on can be further added to the condition for decision to determine the jacked-up state of the vehicle body, as shown in FIGS. 4 to 7, inclusive.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A suspension system for an automotive vehicle, comprising:
   a cylinder interposed between a sprang weight and an unsprung weight for each of a plurality of wheels;
   supply and discharge means for supplying and discharging an operating liquid to the cylinder;
   posture control means for carrying out control over a posture of a vehicle body by controlling the supply and discharge means on the basis of a predetermined condition;
   jacked-up state detecting means for detecting a jacked-up state of the vehicle body; and
   control mode changing means for changing control by the posture control means from an ordinary control mode to a jack-up mode when the jacked-up state is detected by the jacked-up state detecting means;
   wherein the jack-up mode is so set as to carry out control by the posture control means more slowly than the ordinary control mode.

2. A suspension system as claimed in claim 1, wherein the jack-up mode decreases a control gain for the control over the posture of the vehicle body to a greater degree than the ordinary control mode.

3. A suspension system as claimed in claim 2, further comprising inner pressure regulating means for regulating an inner pressure within each of the cylinders to a predetermined minimum pressure or lower by restricting the posture control of the vehicle body;
   wherein the predetermined minimum pressure is changed to a larger value at the time of the jack-up mode than at the time of the ordinary control mode.

4. A suspension system as claimed in claim 2, wherein:
   the supply and discharge means comprises an inflow valve for flowing the operating liquid into each cylinder and a discharge valve for discharging the operating liquid to each cylinder; and
   if the inflow valve is fixed to an open position when the jacked-up state is detected by the jacked-up state detecting means a fail decision is inhibited.

5. A suspension system as claimed in claim 2, further comprising vehicle height detecting means for detecting a vehicle height at each wheel;
   wherein the posture control means controls a posture of the vehicle body so as to assume a predetermined posture on the basis of the vehicle height detected by the vehicle height detecting means.

6. A suspension system as claimed in claim 5, wherein:
   the posture of the vehicle body to be assumed on the basis of the vehicle height detecting means comprises a bounce posture, a pitching posture and a roll posture;
   the posture control means comprises first control means for controlling the bounce posture so as to reach a predetermined target vehicle height, second control means for suppressing the pitching posture and third control means for controlling the roll posture so as to reach a predetermined target roll; and the jack-up mode decreases a control gain for each of the first control means, the second control means and the third control means to a greater degree than the ordinary control mode.

7. A suspension system as claimed in claim 6, further comprising vehicle-height displacement-speed detecting means for detecting a speed of displacement of the vehicle height at each wheel;

wherein the posture control means further controls so as to suppress the speed of displacement of the vehicle height detected by the vehicle-height displacement-speed detecting means.

8. A suspension system as claimed in claim 7, wherein:

two kinds of speeds of displacement consisting of a speed of displacement in a pitching direction and a speed of displacement in a roll direction are determined on the basis of the speed of displacement of the vehicle height detected by the vehicle height detecting means; and the posture control means further comprises fourth control means for suppressing the speed of displacement in the pitching direction and fifth control means for suppressing the speed of displacement in the roll direction.

9. A suspension system as claimed in claim 6, further comprising a plurality of acceleration detecting means for detecting vertical acceleration acting upon the vehicle body; and the posture control means further suppresses the vertical acceleration detected by the acceleration detecting means.

10. A suspension system as claimed in claim 9, wherein:

three kinds of vertical acceleration consisting of acceleration in a bounce direction, acceleration in a pitching direction and acceleration in a roll direction are determined on the basis of the vertical acceleration detected by the acceleration detecting means; and the posture control means further comprises sixth control means for suppressing the acceleration in the bounce direction, seventh control means for suppressing the acceleration in the pitching direction, and eighth control means for suppressing the acceleration in the roll direction.

11. A suspension system as claimed in claim 2, wherein:

the posture control means suppresses a warp to be caused between a front portion and a rear portion of the vehicle body; and the jack-up mode decreases a control gain for control for suppressing the warp by the posture control means to a greater degree than the ordinary control mode.

12. A suspension system as claimed in claim 2, wherein:

vehicle height detecting means for detecting a vehicle height at each wheel;

displacement-speed detecting means for detecting a speed of displacement of the vehicle height at each wheel;

a plurality of acceleration detecting means for detecting each vertical acceleration acting upon the vehicle body;

warping force detecting means for detecting a warping force acting between a front portion and a rear portion of the vehicle body;

first posture determining means for determining a bounce posture, a pitching posture and a roll posture of the vehicle body on the basis of the vehicle height detected by the vehicle height detecting means;

second posture determining means for determining a speed of displacement in a pitching direction and a speed of displacement in a roll direction on the basis of the speed of displacement detected by the displacement-speed detecting means; and third posture determining means for determining acceleration of the vehicle body in a bounce direction, acceleration thereof in the pitching direction, and acceleration thereof in the roll direction, on the basis of acceleration detected by one of said acceleration detecting means;

wherein the posture control means comprises:

first control means for controlling the bounce posture so as to assume a predetermined target vehicle height;

second control means for suppressing the pitching posture;

third control means for controlling the roll posture so as to reach a predetermined target roll;

fourth control means for suppressing the speed of displacement in the pitching direction;

fifth control means for suppressing the speed of displacement in the roll direction;

sixth control means for suppressing the acceleration in the bounce direction;

seventh control means for suppressing the acceleration in the pitching direction;

eighth control means for suppressing the acceleration in the roll direction; and ninth control means for suppressing the warping force.

13. A suspension system as claimed in claim 12, wherein control gains for the first control means, the second control means, the third control means and the ninth control means are decreased at the time of the jack-up mode to a greater degree than at the time of the ordinary control mode.

14. A suspension system as claimed in claim 1, wherein the jacked-up state detecting means determines the jacked-up state when at least a vehicle speed is zero and a parking brake is operating.

15. A suspension system as claimed in claim 1, wherein the jacked-up state detecting means determines the jacked-up state when at least a vehicle speed is zero and in ignition switch is turned on.

16. A suspension system as claimed in claim 15, wherein the jacked-up state detecting means determines the jacked-up state when a condition is further satisfied that all wheels are rebounding.

17. A suspension system as claimed in claim 16, wherein the jacked-up state detecting means determines the jacked-up state when the condition is further satisfied that all wheels are rebounding, after a predetermined time period is elapsed after the ignition switch has been turned on and the vehicle speed has turned to zero.

18. A suspension system as claimed in claim 16, wherein the jacked-up state detecting means determines the jacked-up state when the condition is further satisfied that all wheels are rebounding in a state that a parking brake is operating.

19. A suspension system as claimed in claim 15, wherein the jacked-up state detecting means determines the jacked-up state when the condition is further satisfied that all wheels are rebounding in a state that an inner pressure for all the cylinders is decreasing.

20. A suspension system as claimed in claim 19, wherein the jacked-up state detecting means determines the jacked-up state when the condition is further satisfied that the inner pressure for all the cylinders is decreasing after a predetermined time period is elapsed after the ignition switch has been turned on and the vehicle speed has turned to zero.

21. A suspension system as claimed in claim 19, wherein the jacked-up state detecting means determines the jacked-up state when the condition is further satisfied that the inner pressure for all the cylinders is decreasing in a state that a parking brake is operating.

22. A suspension system as claimed in claim 1, wherein the jacked-up state detecting means determines the jacked-up state when at least all wheels are rebounding.

23. A suspension system as claimed in claim 1, wherein the jacked-up state detecting means determines the jacked-up state when at least an inner pressure within all cylinders is decreasing.

24. A suspension system as claimed in claim 1, wherein each cylinder has one liquid pressure chamber defined within its inside to which and from which the operating liquid is supplied and discharged.

25. A suspension system as claimed in claim 24, wherein a gas spring is connected to the liquid pressure chamber of each cylinder.

26. A suspension system as claimed in claim 1, wherein:
the supply and discharge means comprises an inflow valve and a discharge valve, each being of a flow rate control type; and
the posture control means generates a signal indicative of a flow rate to the inflow valve and a flow rate to the discharge valve.

* * * * *